(12) United States Patent
Hickey

(10) Patent No.: US 6,776,914 B2
(45) Date of Patent: Aug. 17, 2004

(54) PROCESS FOR TREATING LIQUID SEPTAGE

(76) Inventor: Roger A. Hickey, P.O. Box 982, Centralia, WA (US) 98531

( * ) Notice: Subject to any disclaimer, the term of this patent is extended or adjusted under 35 U.S.C. 154(b) by 0 days.

(21) Appl. No.: 10/409,764

(22) Filed: Apr. 8, 2003

(65) Prior Publication Data

US 2003/0201233 A1 Oct. 30, 2003

Related U.S. Application Data

(63) Continuation-in-part of application No. 10/117,304, filed on Apr. 5, 2002.

(51) Int. Cl.$^7$ .................................................. C02F 1/54
(52) U.S. Cl. ............................ 210/709; 71/13; 210/710; 210/712; 210/725; 210/727; 210/737; 210/764
(58) Field of Search ................................ 210/609, 612, 210/614, 631, 709, 710, 724, 725, 727, 737, 742, 743, 749, 764, 768, 747, 787; 71/12, 13

(56) References Cited

U.S. PATENT DOCUMENTS

| | | | | |
|---|---|---|---|---|
| 3,345,288 A | * | 10/1967 | Sontheimer | 210/609 |
| 4,270,279 A | | 6/1981 | Roediger | 34/9 |
| 4,306,978 A | | 12/1981 | Wurtz | 210/750 |
| 4,781,842 A | * | 11/1988 | Nicholson | 405/129.25 |
| 5,275,733 A | | 1/1994 | Burnham | 210/609 |
| 5,312,551 A | * | 5/1994 | Perron et al. | 210/712 |
| 5,417,861 A | | 5/1995 | Burnham | 210/609 |
| 5,536,418 A | * | 7/1996 | Foss | 210/758 |
| 5,554,279 A | * | 9/1996 | Christy | 210/149 |
| 5,681,481 A | | 10/1997 | Christy et al. | 210/723 |
| 5,783,073 A | | 7/1998 | Christy et al. | 210/205 |
| 5,851,404 A | | 12/1998 | Christy et al. | 210/723 |
| 6,103,191 A | * | 8/2000 | Luker | 422/38 |
| 6,558,550 B1 | * | 5/2003 | Kelly | 210/609 |

* cited by examiner

Primary Examiner—Peter A. Hruskoci
(74) Attorney, Agent, or Firm—Garrison & Associates PS (57) ABSTRACT

A process for treating liquid septage and other biosolids having the steps of placing a known amount of liquid septage in a tank, mixing in a sufficient quantity of alkaline material to raise the pH to a desired level, flocculating the septage, storing the pH adjusted septage for a predetermined period of time, thickening the septage, de-watering the septage, and pasteurizing the resultant liquid effluent and de-watered solids cake. The process for treating liquid septage and biosolids disclosed by the current invention meets the Class A vector attractant reduction and pathogen reduction requirements mandated by the U.S. EPA. The end product of septage and other biosolids treated using the process disclosed by the current invention can be sold as fertilizer, and utilized without any additional permits.

48 Claims, 4 Drawing Sheets

PROCESS FOR TREATING LIQUID SEPTAGE

CROSS-REFERENCE TO RELATED APPLICATION(S)

This application is a continuation in part of prior application Ser. No. 10/117,304, filed Apr. 5, 2002, and entitled Process for Treating Liquid Septage and Biosolids.

TECHNICAL FIELD

The invention relates to a process for the treatment of liquid septage and biosolids. In particular, this invention describes a process whereby alkaline material is mixed with liquid septage, the septage is de-watered, the de-watered solids are pasteurized, and the end product meets the Class A vector attractant reduction and pathogen reduction requirements mandated by the U.S. EPA. A process for treating liquid septage and biosolids is also disclosed whereby alkaline material is mixed with liquid septage, the septage is de-watered, and the end product meets the Class B pathogen reduction requirements mandated by the U.S. EPA.

BACKGROUND OF THE INVENTION

With the increasing number of homes that utilize septic tanks, the need for treating liquid septage has increased substantially in recent years. Untreated septage, both in solid and liquid form, may contain any number of noxious substances that are harmful to humans and the environment. These include particulate solids, organic and inorganic compounds, and pathogens.

There is developing an increasing demand that the treatment of septage be sufficiently thorough to allow beneficial re-use of septage, such as enabling the septage to be applied to land on which agricultural and ornamental crops may be grown. While septage has beneficial plant nutrients, it also may contain bacteria, viruses, protozoa, parasites, and other microorganisms which may be disease causing. In an effort to make stabilized septage more marketable, those treating the septage have attempted to produce a granular, scatterable product having a soil-like texture.

Because septage is identical to municipal sewage sludge, processes and methods used to treat sludge can also be used to treat septage, and nearly all EPA regulations that apply to sewage sludge also apply to septage. One way of treating sludge is to mix alkaline products with the sludge in a manner that blends the alkaline and sludge and transforms the otherwise watery sludge into an acceptable end product. With the development of modern sewage systems, the use of lime products for flocculation of solids in raw sewage or liquid sludge has been developed. The role of alkaline materials in pH adjustment and the beneficial effect of pH in pathogen reduction is a more recent development, having occurred in only the last 60 years.

The end result of research into pathogen reduction in wastewater treatment has prompted the U.S. Environmental Protection Agency to promulgate regulations specifying environmentally sound treatment criteria. More specifically, the EPA's standards for the use or disposal of sewage sludge (40 CFR 503; "Methods for Treatment and Disposal of Sewage Sludge,") establishes methods for achieving pathogen and vector attraction reduction using alkalinity (pH) and temperature criteria.

The aforementioned EPA regulation outline a number of chemical processes allowed to treat sludge to render it suitable for beneficial use in agriculture and similar application. The regulations establish two classes of sludge treatment products: Class A and Class B. A Class A product can be achieved by heating the sludge to no less than 50° C. for no less than 30 minutes while simultaneously raising the product pH to no less than 12 and keeping this pH level for at least 2 hours, followed by a pH of 11.5 for 22 hours. Adding quicklime to liquid or de-watered sludge can achieve the aforementioned pH, temperature and time conditions.

A majority of research in this field involves the pathogenic stabilization of sludge through pH adjustment and heat generated from the exothermic reaction of quicklime with water. U.S. Pat. No. 4,270,279 issued to Roediger and U.S. Pat. No. 4,306,978 issued to Wurtz disclose methods utilizing such research. U.S. Pat. No. 4,270,279 discloses the gentle handling of partially de-watered sludge cake and dusting only the surfaces of sludge particles thus resulting in a granular product; however, this process can only be carried out using partially de-watered sludge cake in sheet form prepared by belt filter presses.

Lime is the major expense in the lime treatment process. In order to meet current Class A requirements mandated by the U.S. EPA, some sludge treatment processes require the use of significant amounts of lime. It is not uncommon to use between 900 pounds and two tons of lime per ton of dry solids, depending upon moisture content of the incoming sludge (usually between 15% and 35% total solids) and the end product dryness required for beneficial use (usually 45% to 60% total solids).

One further method to treat waste to kill pathogens is to heat it to a high temperature for a period of time. Commonly known as pasteurization, this process neutralizes pathogens to a degree dependent upon the level of temperature and length of time that the waste is exposed to the elevated level. Where both pasteurization and the addition of an alkaline added in combination are performed, pasteurization temperatures can kill pathogenic organisms while the alkaline additive can prevent regrowth of organisms. The result can be an end product that can be stored for extended periods of time. If satisfactorily processed in this manner, sludge may be applied to lands without need for site-specific permits, and thus may be marketed, distributed, and sold as fertilizer.

To properly ensure complete pathogen reduction, and to meet the Class A requirements mandated by U.S. EPA, the heated sludges must be held at no less than 50° C. for no less than 30 minutes. Since these sludges are exempt from many restrictions for land application, EPA has stated that the time-temperature requirements apply to every particle of sludge processed.

Currently, there are several known methods wherein alkaline material is added to the sludge and the sludge is subjected to additional heat. U.S. Pat. Nos. 5,275,733 and 5,417,861, both issued to Burnham, disclose a method for treating de-watered sludge. This method discloses adding alkaline material to de-watered sludge and then subjecting the sludge to additional heat for drying and sterilization. U.S. Pat. Nos. 5,681,481; 5,783,073; and 5,851,404; all issued to Christy et al., disclose a method for treating sludge wherein alkaline material is added to a substantially liquid sludge and the sludge is then subjected to additional heat.

Both of these methods are inefficient in that adjusting the pH level of de-watered sludge requires more alkaline material than needed to adjust the pH level of liquid sludge. Adjusting the pH level of de-watered sludge also requires more energy to mix in the alkaline material than needed when treating liquid sludge. Conversely, adding heat to pasteurize liquid sludge requires more energy than pasteurizing sludge after it is de-watered.

Currently, there are several devices commercially available that attempt to address the inefficiency of pasteurizing liquid sludge by combining de-watering and pasteurization during the treatment process. However, these devices still must heat at least some of the liquid in the sludge. Additionally, the production rate of this process is slower than other processes due to the de-watering step being slowed down so the sludge can meet the EPA mandated time and temperature requirements for pasteurization.

Accordingly, there is clearly a need for a process that can meet the EPA Class A pH, and pasteurization requirements while minimizing the amount of alkaline material and energy needed to carry out the process. Moreover, there is a need for a process which efficiently and effectively achieves a virtually pathogen free end product which is unsuitable for the regrowth of undesirable organisms.

DISCLOSURE OF THE INVENTION

While the term septage is commonly used to describe the material removed from septic tanks, the invention disclosed herein can also be used to treat other biosolids including but not limited to, waste removed from portable toilets, sewage sludge, and other types of sludge. As used herein, the term septage should be read to include other types of biosolids, and the term biosolid should be read to include septage.

It is a primary object of the present invention to provide a process for treating liquid septage and other organic wastes (biosolids).

It is also an object of this invention to provide a process that overcomes the inefficiencies associated with the prior art.

Another object of the present invention is to provide a novel process that uses less alkaline material, than the prior art processes, to meet the Class A vector attractant reduction and pathogen reduction requirements mandated by the U.S. EPA.

It is a further object of the present invention to provide a novel process that uses less energy for pasteurization, than prior art processes use to meet Class A vector attractant reduction and pathogen reduction requirements mandated by the U.S. EPA.

Yet another object of this invention is to provide such a process that is cost effective and easy to implement.

These, as well as additional objects of the present invention, are attained by mixing the liquid septage with sufficient alkaline material to raise the pH level of the septage to 12 or greater for a minimum of 2 hours and hold it at 11.5 pH or greater for an additional 22 hours.

While the preferred alkaline material for this process is quicklime, other materials including hydrated lime, limestone, fly ash, wood ash, sodium or potassium hydroxide, kiln dust, etc., can also be used. The mixing of alkaline material with the liquid septage is achieved by metering lime into the septage and using the turbulence generated in the re-circulating pump, plumbing and holding tank to mix the lime and septage. Mixing can also be accomplished by agitating the liquid with air or mechanical devises.

The pH-adjusted septage is then stored for a period of at least 24 hours and the pH level is monitored to ensure that it meets the Class A vector attractant reduction and pathogen reduction requirements mandated by the U.S. EPA.

The pH-adjusted septage can be mixed with a polymeric flocculent either before or after the storage process. The mixing of the flocculent and the pH-adjusted septage can be achieved by agitating with mechanical devises, or turbulence of the liquid. The flocculent thickens the septage by binding to the solids and causing the solids to settle to the bottom of a storage tank such that the liquid effluent can be decanted off of the top. The liquid effluent is then pasteurized by heating it to a temperature and held at that temperature for sufficient time to meet the Class A vector attractant reduction and pathogen reduction requirements mandated by the U.S. EPA.

The flocculated pH adjusted septage blend is fed into a de-watering device where the free liquid is separated from the solids and drained away. The septage is further subjected to pressure to remove additional liquid producing a de-watered solids cake that ranges from 15% to 50% solids or 85% to 50% water content. While the preferred de-watering device is a screw press, other de-watering devises including belt presses, centrifuges, or rotary presses, etc. can be used. The liquids separated from the septage during de-watering can be mixed with the liquid effluent removed after flocculation if it does not contain a very high percentage of solids. If the liquids removed during de-watering contain a high percentage of solids, it is added to a subsequent batch of septage and repeats the process.

The de-watered solids cake is discharged from the screw press and conveyed into pasteurization equipment where it is heated to a temperature and held at that temperature for sufficient time to meet the Class A vector attractant reduction and pathogen reduction requirements mandated by the U.S. EPA.

In other embodiments of the current invention, the septage is de-watered before it is stored, and flocculation occurs immediately before it is de-watered. The de-watered solids cake and the liquid effluent can then either be pasteurized and then placed in a storage area for monitoring of the pH level, or stored and then pasteurized at the completion of storage.

The advantage of the above process is lower alkaline material dosage to achieve the required pH, higher production rates from the screw press, and lower energy costs for pasteurization. The average amount of quick lime used per dry ton of solids in this process is 300 pounds, while that used in processes that require mechanical mixing or where the quick lime is applied to de-watered septage is 400–1000 pounds per-dry ton. When commercially available screw presses are not used for pasteurization, it is possible to increase the production of septage de-watered cake by up to 100% without an offsetting increase of cake moisture content. Additionally, the use of an enclosed pasteurization vessel for the de-watered solids and a heat exchanging pasteurization device for the liquid effluent, is more efficient than pasteurizing the solids and liquids together, and therefore saves energy costs.

BRIEF DESCRIPTION OF THE DRAWING

The several objectives and features of the present invention will become more readily apparent from the following detailed description taken in conjunction with the accompanying drawing in which.

BEST MODE OF CARRYING OUT THE INVENTION

Turning now to the drawing, the invention will be described in preferred embodiments by reference to the numerals of the drawing figures wherein like numbers indicate like parts. The end product of the process described in this application meets United States Environmental Protection Agency requirements for pathogen and vector attractant reduction as specified in 40 CFR § 503, and that section is hereby incorporated into this application by reference.

Figure 1:
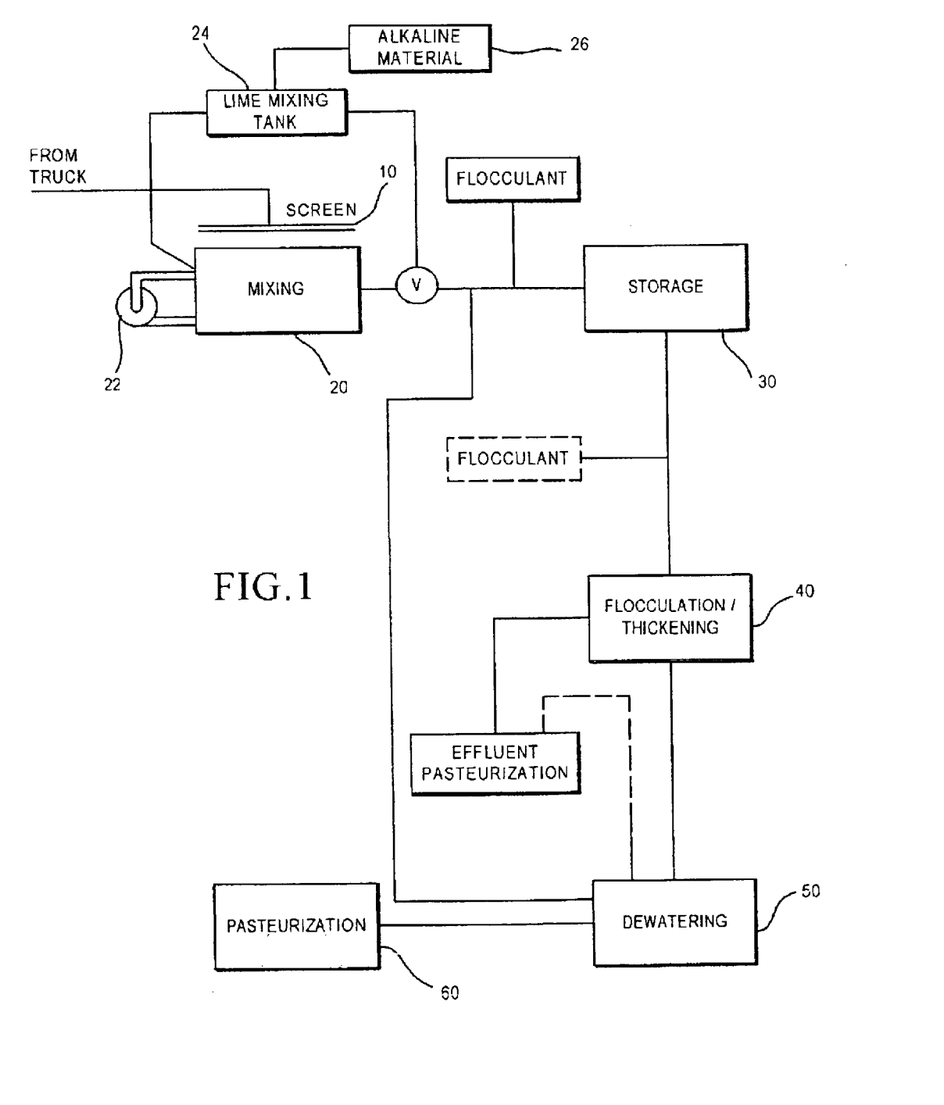
FIG. 1 is a flow diagram illustrating a preferred embodiment of a process for treating liquid septage and biosolids in accordance with the teachings of the present invention.

Referring to FIG. 1, a preferred embodiment of a process for treating liquid septage and biosolids includes the steps of screening 10, mixing 20, storage 30, flocculation 40, de-watering 50 and pasteurization 60. In this preferred embodiment known amounts of liquid septage are discharged from trucks into an open topped, in ground mixing tank. The septage is ran through a screen prior to going into the mixing tank to remove all debris, trash, and other non-organic matter.

Once in the tank, the septage is circulated through the mixing tank by a re-circulation pump 22. A portion of the septage is circulated out of the mixing tank and piped into a lime application tank 24 where an amount of quick lime, or other alkaline material 26 is metered into the septage. The septage in the lime application tank is then discharged back into the mixing tank near the inlet of the re-circulation pump.

The septage is circulated through the mixing tank in this manner until sufficient quick lime has been added to raise the pH of the septage to a desired level. The amount of alkaline material added is determined based on the pH level of the septage, the lime demand of the septage, the alkalinity of the alkaline material, and the desired pH level to be attained (usually 12 or greater for a minimum of 2 hours and hold it at 11.5 pH or greater for an additional 22 hours). Lime demand is determined by the type of septage or biosolid being treated. Some types of septage and biosolids require more alkaline material to raise the pH to a desired level than other types of septage with an identical initial pH level, these types of septage and biosolids are said to have a high lime demand.

It has been found that the use of a re-circulation pump is the most efficient method of mixing the quick lime with the septage to ensure a more even distribution. However, other methods of mixing such as mechanical devices, or agitating the liquid with air can also be used to attain sufficient mixing. Additionally, it has been found that mixing the quick lime with liquid septage results in more thorough contact with the solid particles therefore requiring less quick lime than processes that apply the lime to de-watered solids.

While the mixing tank in this embodiment is an open topped in ground tank, and the lime application tank is above ground, both tanks can be above ground, both tanks can be in ground tanks, or either tank can be in ground with the other above ground and the process will still work.

After the septage has been adequately pH adjusted, it is piped into a storage tank where it is stored until at least 24 hours after it was discharged from the mixing tank. The septage is tested during storage to ensure that it maintains pH levels sufficient to meet the vector attractant reduction requirements (usually no less than a pH of 12 at least two hours after mixing with the alkaline material and no less than 11.5 at least 24 hours after mixing with the alkaline material).

A polymeric flocculent can be added to the pH adjusted septage before storage so that flocculation can occur during the storage period. At the end of the storage period, the septage is thickened by decanting the liquid effluent off of the top portion of the storage tank, thereby leaving the flocculated solids. If the flocculent is not added until after the septage is stored and pH tested, a separate tank can be used for flocculation. However, it is more efficient to add the flocculent prior to the step of storing the liquid septage.

Figure 4:
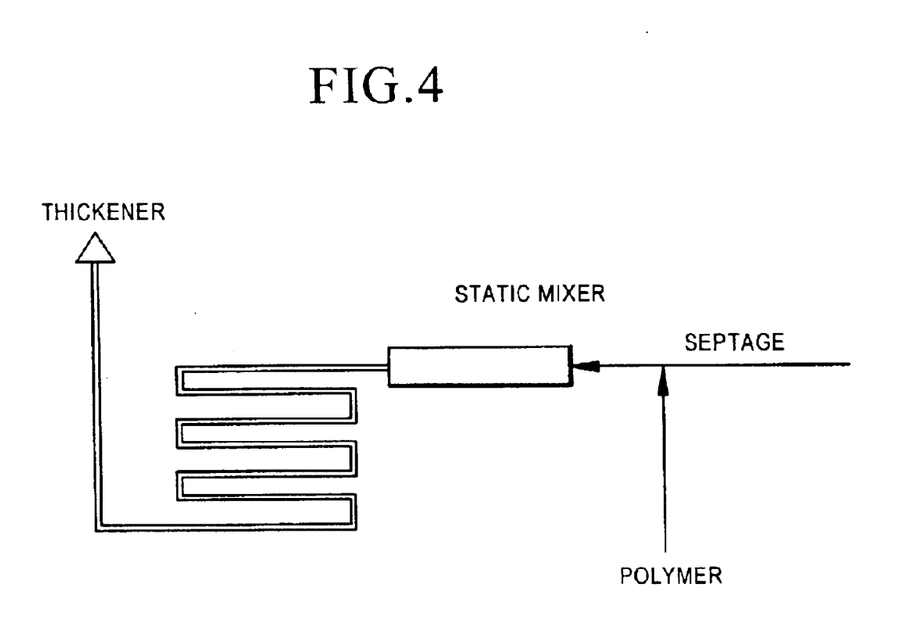
FIG. 4 illustrates one method of mixing polymeric flocculent into liquid septage according to the teachings of the invention.

The flocculent can be mixed into the septage using mechanical devices or the turbulence of the liquid as it is discharged from the mixing tank. FIG. 4 shows one method for mixing the flocculent into the liquid septage. The flocculent 80 is added to the septage as it flows through a pipe. The liquid septage flows through a static mixer having a plurality of spiral blades, and then through a series of ninety-degree terns in the pipe and into, a storage tank or a separate flocculation tank.

Referring again to FIG. 1, the liquid effluent removed after flocculation is then pasteurized using a heat exchanger. The heat exchanger increases the efficiency of the pasteurization process by using the energy from previously pasteurized effluent to bring up the temperature of unpasteurized effluent.

After thickening, the septage is then fed into to a screw press where it is de-watered by separating the free liquid from the solids. The solids are further subjected to pressure to remove additional liquids, thereby producing a de-watered solids cake that ranges from 15% to 50% solids. While the preferred de-watering device for this process is a screw press, other de-watering devices can be used. If the resultant liquid effluent from this de-watering contains a low percentage of solids, it can be mixed with the liquid effluent decanted during thickening and then pasteurized, or it can be mixed into a new batch of liquid septage if it contains a higher percentage of solids The de-watered solids cake is discharged from the screw press and conveyed into an enclosed pasteurization vessel. Sufficient heat is applied to raise the temperature of the de-watered solids cake to 50° C. and maintain that temperature for a period of at least 20 minutes. The time and temperature requirements for pasteurizing both the de-watered solids cake and the liquid effluent can be determined by using the following equations:

If the percentage of solids is seven or higher, the material is heated to a temperature of at least 50° C. and maintained at that temperature for a period of at least 20 minutes and the temperature and time period shall be determined according to the equation $$D = \frac{131,700,000}{10^{0.1400t}}$$

where, D is the time in days and t is the temperature in degrees Celsius, but if the percent of solids is less than seven, the material is heated to a temperature of at least 50° C. and maintained at that temperature for a period of at least 30 minutes and the temperature and time period shall be determined according to the equation $$D = \frac{50,070,000}{10^{0.1400t}}$$

where, D is the time in days and t is the temperature in degrees Celsius;

or if the percent of solids is less than seven, and the material is heated for a period of at least 15 seconds but less than 30 minutes, the temperature and time period shall be determined according to the equation $$D = \frac{131,700,000}{10^{0.1400t}}$$

where, D is the time in days; and t is the temperature in degrees Celsius.

Figure 2:
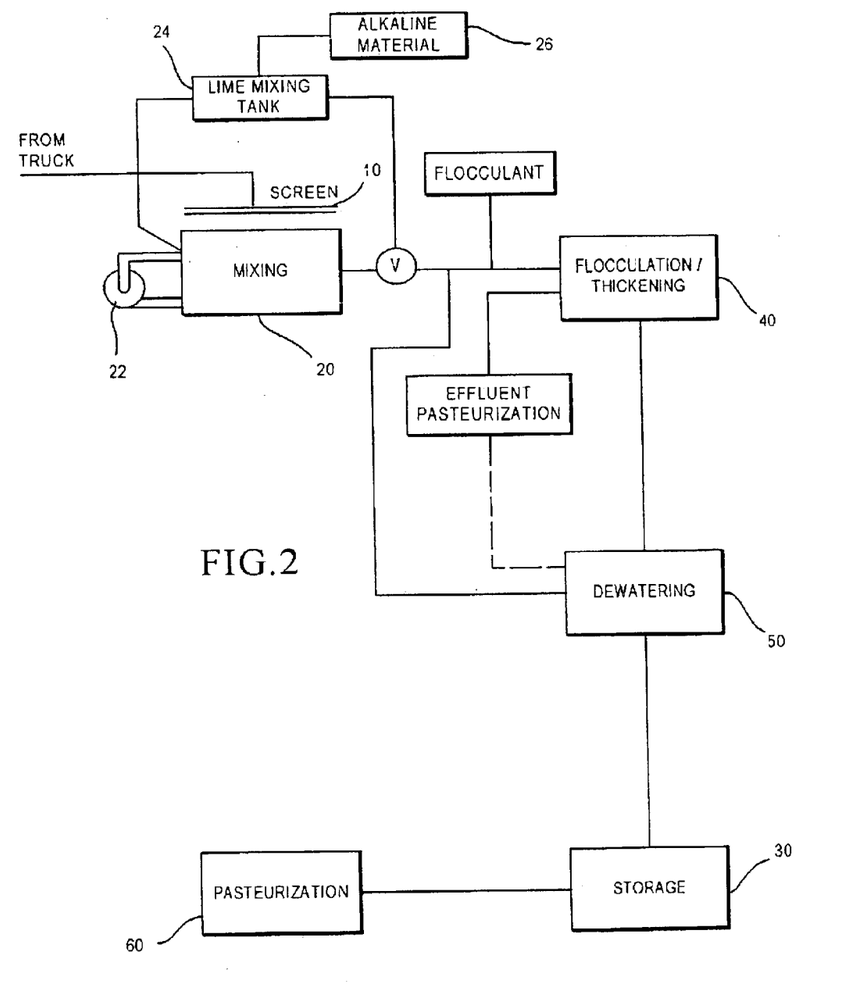
FIG. 2 is a flow diagram illustrating a second preferred embodiment of a process for treating liquid septage and biosolids in accordance with the teachings of the present invention.

Referring to FIG. 2, another preferred embodiment of a process for treating liquid septage and biosolids includes the steps of screening 10, mixing 20, flocculation 40, de-watering 50 storage 30, and pasteurization 60.

In this embodiment, septage is screened and the pH level of the liquid septage is adjusted in the same manner previously described. A polymeric flocculent is then added to the pH adjusted septage and mixed into the septage using mechanical devices or turbulence of the liquid. The septage is flocculated in a tank and the liquid effluent is decanted off of the flocculated septage, thereby thickening it. The thickened septage is then fed into a screw press and de-watered in the same manner described above.

The de-watered solids cake and the liquid effluents are then stored until at least 24 hours mixing with the alkaline material. The pH levels of the septage and effluents are tested during the process as described above.

Upon completion of storage, the de-watered solids cake and the effluents are pasteurized as described above.

Figure 3:
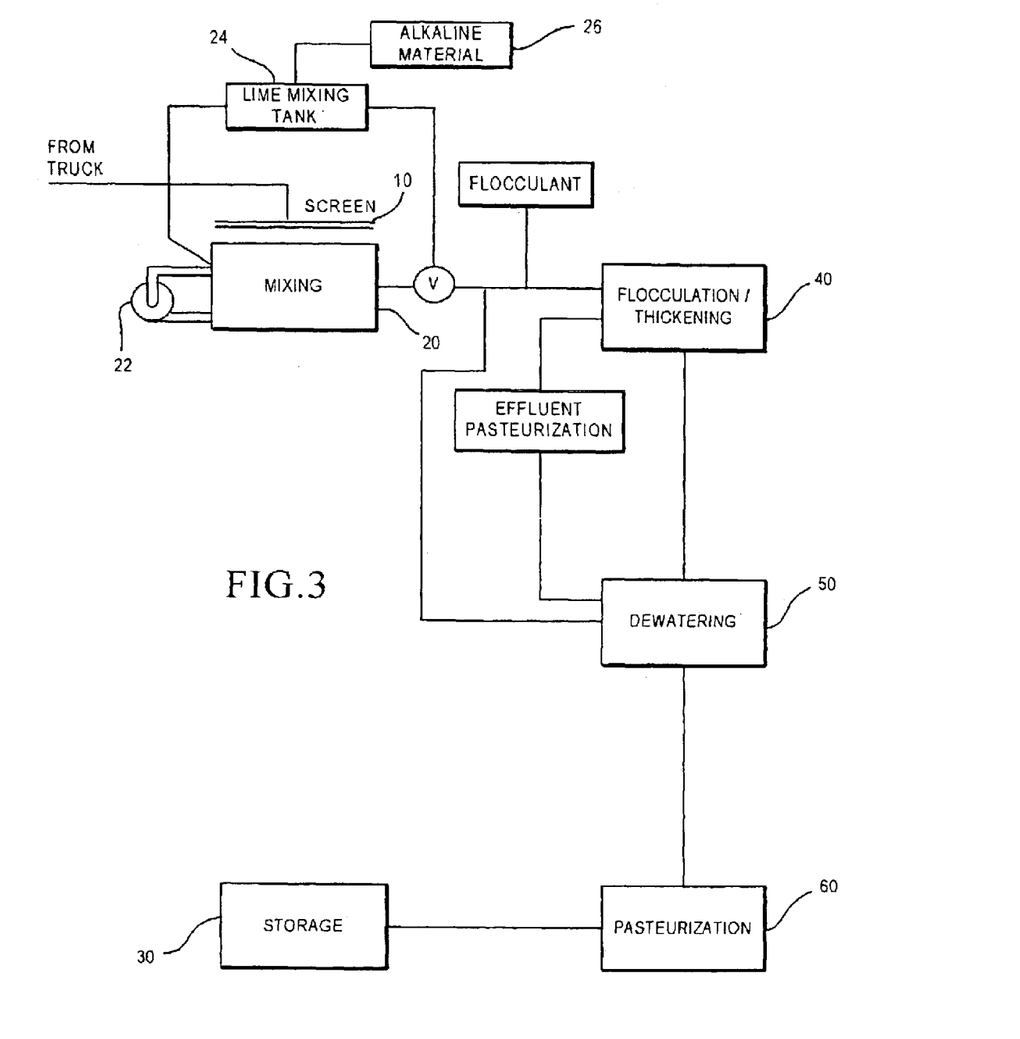
FIG. 3 is a flow diagram illustrating a third preferred embodiment of a process for treating liquid septage and biosolids in accordance with the teachings of the present invention.

Referring to FIG. 3, a third preferred embodiment of a process for treating liquid septage and biosolids includes the steps of screening 10, mixing 20, flocculation 40, de-watering 50, pasteurization 60, and storage 30.

In this embodiment, the septage is screened, the pH level of the liquid septage is adjusted, a polymeric flocculent is added, the septage is thickened and the septage is de-watered in the same manner previously described. The de-watered solids cake and the effluents are pasteurized as described above. The solids cake and effluents are then stored until at least 24 hours after mixing with the alkaline material and periodically tested for pH level as described above.

In all embodiments of the present invention the septage can also be thickened by using a thickening device, such as a belt thickener, a drum thickener, etc. When a thickening device is used, the septage is subjected to a filtering or screening procedure that allows the a portion of the liquids to pass through the filter, and be drained away, while retaining the solids.

In all embodiments described, the pH level of the septage or de-watered solids is tested at least 2 hours after the pH adjusted septage has been discharged from the mixing tank and it is tested again at least 24 hours after the pH adjusted septage has been discharged from the mixing tank.

If a Class B end product is desired, the step of pasteurization can be skipped. The resultant end product will meet the U.S. EPA standards for class B, and can be ground applied for use as fertilizer with the proper permits.

The process for treating liquid septage and biosolids disclosed by the current invention meets the Class A vector attractant reduction and pathogen reduction requirements mandated by the U.S. EPA. This invention uses less alkaline material than processes wherein the alkaline material is added to de-watered biosolids. This invention uses less energy for pasteurization than processes that pasteurize biosolids in their liquid state or during de-watering. The production rate of de-watered solids cake of the current invention is greater than processes pasteurize biosolids during de-watering. The end product of septage, effluent, and other biosolids treated using the process disclosed by the current invention can be sold as fertilizer, and applied without any additional permits.

Industrial Applicability

The invention has applicability to the field of treatment of liquid septage and other biosolids. In compliance with the statute, the invention has been described in language more or less specific as to its process. It is to be understood, however, that the invention is not limited to the specific embodiments shown or described, since the means and embodiments shown or described comprise preferred forms of putting the invention into effect. Additionally, while this invention is described in terms of a process for treating liquid septage and other biosolids, it will be readily apparent to those skilled in the art that the invention can be adapted to other uses as well. The invention should not be construed as being limited to treating liquid septage and other biosolids, and is therefore, claimed in any of its forms or modifications within the legitimate and valid scope of the appended claims, appropriately interpreted in accordance with the doctrine of equivalents.

What is claimed is:

1. A process for treating liquid septage comprising the steps of:

removing non-organic matter from liquid septage;

adding an alkaline material to said septage wherein said septage is placed in a mixing tank after said non-organic materials are removed and said alkaline material is added to said septage by circulating a portion of said septage from said mixing tank into a separate tank; metering said alkaline material into said portion of said septage; and reintroducing said portion of said septage into said mixing tank;

mixing said alkaline material into said septage until said septage reaches a predetermined pH level;

de-watering said septage; and heating the de-watered septage to a predetermined temperature for a predetermined time.

2. The process of claim 1 wherein said alkaline material is selected from the group consisting of quick lime, hydrated lime, limestone, fly ash, wood ash, sodium hydroxide, potassium hydroxide, and kiln dust.

3. The process of claim 1 wherein the quantity of alkaline material added to said septage is determined based on the quantity of liquid septage, the pH level of said septage, the lime demand of said septage, and the alkalinity of said alkaline material.

4. The process of claim 3 wherein said amount of alkaline material is 250 pounds to 400 pounds per dry ton of solids in said septage.

5. The process of claim 3 wherein said amount of alkaline material is greater than 400 pounds per dry ton of solids in said septage.

6. The process of claim 1 wherein said predetermined pH level is at least 12.

7. The process of claim 1 having the additional steps of storing said septage for a predetermined period of time; and testing said septage at predetermined intervals of time to ensure the pH is maintained at predetermined levels wherein said additional steps can occur at any point in said process after said step of mixing said alkaline material into said septage.

8. The process of claim 7 wherein said predetermined time in said step of storing said septage is at least 24 hours after said septage has reached said predetermined pH level.

9. The process of claim 7 wherein said step of testing said septage comprises testing said septage at least 2 hours after said septage is mixed with said alkaline material to ensure that the pH level of said septage is at least 12; and testing said septage at least 24 hours after said septage is mixed with said alkaline material to ensure that the pH level of said septage is at least 11.5.

10. The process of claim 7 wherein said step of testing said septage at predetermined intervals of time to ensure the pH is maintained at predetermined levels comprises testing said septage as specified in 40 CFR §503.33 for vector attractant reduction for class A sludge.

11. The process of claim 1 wherein said septage is de-watered in a device selected from a group consisting of screw presses, belt presses, centrifuges, and rotary presses.

12. The process of claim 1 wherein said step of heating said de-watered septage to a predetermined temperature for a predetermined time is done in an enclosed pasteurization vessel.

13. The process of claim 1 wherein said step of heating said de-watered septage to a predetermined temperature for a predetermined time comprises heating said de-watered solids to a temperature of at least 50° C. and maintained at that temperature for a period of at least 20 minutes and the temperature and time period shall be determined according to the equation $$D = \frac{131{,}700{,}000}{10^{0.1400t}}$$

where, D is the time in days; and t is the temperature in degrees Celsius.

14. The process of claim 1 wherein a polymeric flocculent is mixed into said septage before said step of de-watering said septage.

15. The process of claim 14 wherein said septage is thickened by decanting liquid effluent from said septage after mixing in said polymeric flocculent but before said step of de-watering said septage.

16. The process of claim 15 wherein said liquid effluent is heated to a predetermined temperature for a predetermined time.

17. The process of claim 16 wherein the liquids removed during said step of de-watering said septage are combined with said liquid effluent prior to heating said effluent to a predetermined temperature for a predetermined time.

18. The process of claim 16 wherein if the percent of solids in said effluent is seven or higher, said effluent is heated to a temperature of at least 50° C. and maintained at that temperature for a period of at least 20 minutes and the temperature and time period shall be determined according to the equation $$D = \frac{131{,}700{,}000}{10^{0.1400t}}$$

where, D is the time in days and t is the temperature in degrees Celsius, but if the percent of solids in said liquid effluent is less than seven, said effluent is heated to a temperature of at least 50° C. and maintained at that temperature for a period of at least 30 minutes and the temperature and time period shall be determined according to the equation $$D = \frac{50{,}070{,}000}{10^{0.1400t}}$$

where, D is the time in days; and t is the temperature in degrees Celsius.

19. The process of claim 16 wherein if the percent of solids in said effluent is less than seven, said effluent is heated for a period of at least 15 seconds but less than 30 minutes and the temperature and time period shall be determined according to the equation $$D = \frac{131{,}700{,}000}{10^{0.1400t}}$$

where, D is the time in days; and t is the temperature in degrees Celsius.

20. The process of claim 16 wherein said de-watered solids and said liquid effluent are heated to a temperature and for a time sufficient to meet the pathogen reduction requirements defined in 40 CFR §503.32 for class A sludge.

21. The process of claim 15 having the additional steps of storing said effluent for a predetermined period of time; and testing said effluent at predetermined intervals of time to ensure the pH is maintained at predetermined levels wherein said additional steps can occur at any point in said process after said septage is thickened.

22. The process of claim 21 wherein said predetermined time in said step of storing said effluent is at least 24 hours after said septage has reached said predetermined pH level.

23. The process of claim 21 wherein said step of testing said effluent at predetermined intervals of time to ensure the pH is maintained at predetermined levels comprises testing said effluent at least 2 hours after said septage is mixed with said alkaline material to ensure that the pH level of said effluent is at least 12; and testing said effluent at least 24 hours after said septage is mixed with said alkaline material to ensure that the pH level of said effluent is at least 11.5.

24. The process of claim 15 wherein the pH of said de-watered solids and said liquid effluent are maintained at levels and for times sufficient to meet the vector attractant reduction requirements defined in 40 CFR §503.33 for class A sludge.

25. The process of claim 1 wherein the liquids removed during said step of de-watering said septage are combined with a subsequent quantity of septage after the subsequent quantity of septage is mixed with an alkaline material.

26. A process for treating liquid septage comprising the steps of:

removing debris, trash, and other non-organic matter from a quantity of liquid septage;

placing said septage into a mixing tank;

adding an amount of alkaline material that has been determined based on the quantity of liquid septage, the pH level of said septage, the lime demand of said septage, and the alkalinity of said alkaline material wherein said septage is placed in a mixing tank after said non-organic materials are removed and said alkaline material is added to said septage by circulating a portion of said septage from said mixing tank into a separate tank; metering said alkaline material into said portion of said septage; and reintroducing said portion of said septage into said mixing tank;

mixing said alkaline material and said septage until the entire quantity of said septage reaches a predetermined pH level;

mixing a polymeric flocculent into said septage;

storing said septage for a predetermined period of time;

testing said septage at predetermined intervals of time to ensure the pH is maintained at predetermined levels;

thickening said septage by decanting liquid effluent from said septage;

de-watering said septage by removing the free liquids from the solids in said septage thereby producing de-watered solids; and heating said de-watered solids and said liquid effluent to predetermined temperatures for a predetermined times.

27. The process of claim 26 wherein said alkaline material is selected from a group consisting of quick lime, hydrated lime, limestone, fly ash, wood ash, sodium hydroxide, potassium hydroxide, and kiln dust.

28. The process of claim 26 wherein said amount of alkaline material is 250 pounds to 400 pounds per dry ton of solids in said septage.

29. The process of claim 26 wherein said amount of alkaline material is greater than 400 pounds per dry ton of solids in said septage.

30. The process of claim 26 wherein said predetermined pH level is at least 12.

31. The process of claim 26 wherein said predetermined time in said step of storing said septage is at least 24 hours after said septage has reached said predetermined pH level.

32. The process of claim 26 wherein said step of testing said septage at predetermined intervals of time to ensure the pH is maintained at predetermined levels comprises testing said septage at least 2 hours after said septage is mixed with said alkaline material, to ensure that the pH level of said septage is at least 12; and testing said septage at least 24 hours after said septage is mixed with said alkaline material, to ensure that the pH level of said septage is at least 11.5.

33. The process of claim 26 wherein said septage is de-watered in a device selected from a group consisting of screw presses, belt presses, centrifuges, and rotary presses.

34. The process of claim 26 wherein said de-watered solids are heated in an enclosed pasteurization vessel.

35. The process of claim 26 wherein said liquid effluent is heated in a heat exchanger.

36. The process of claim 26 wherein the temperature and time for heating the de-watered solids and the liquid effluent are selected according to the following equations:

if the percentage of solids is seven or higher, the material is heated to a temperature of at least 50° C. and maintained at that temperature for a period of at least 20 minutes and the temperature and time period shall be determined according to the equation $$D = \frac{131{,}700{,}000}{10^{0.1400t}}$$

where, D is the time in days and t is the temperature in degrees Celsius;

but if the percent of solids is less than seven, the material is heated to a temperature of at least 50° C. and maintained at that temperature for a period of at least 30 minutes and the temperature and time period shall be determined according to the equation $$D = \frac{50{,}070{,}000}{10^{0.1400t}}$$

where, D is the time in days and t is the temperature in degrees Celsius;

or if the percent of solids is less than seven, and the material is heated for a period of at least 15 seconds but less than 30 minutes, the temperature and time period shall be determined according to the equation $$D = \frac{131{,}700{,}000}{10^{0.1400t}}$$

where, D is the time in days; and t is the temperature in degrees Celsius.

37. The process of claim 26 wherein said de-watered solids and said liquid effluent are heated to a temperature and for a time sufficient to meet the pathogen reduction requirements defined in 40 CFR §503.32 for class A sludge.

38. The process of claim 26 wherein said step of testing said septage at predetermined intervals of time to ensure the pH is maintained at predetermined levels comprises testing said septage as specified in 40 CFR §503.33 for vector attractant reduction for class A sludge.

39. The process of claim 26 wherein the liquids removed during said step of de-watering said septage are combined with said liquid effluent prior to heating said effluent to a predetermined temperature for a predetermined time.

40. The process of claim 26 wherein the liquids removed during said step of de-watering said septage are combined with a subsequent quantity of septage after the subsequent quantity of septage is mixed with an alkaline material.

41. A process for treating liquid septage comprising the steps of:

removing debris, trash, and other non-organic matter from a quantity of liquid septage;

placing said septage into a mixing tank;

selecting an alkaline material from a group consisting of quick lime, hydrated lime, limestone, fly ash, wood ash, sodium hydroxide, potassium hydroxide, and kiln dust;

adding an amount of said alkaline material that has been determined based on the quantity of liquid septage, the pH level of said septage, the lime demand of said septage, and the alkalinity of said alkaline material, by continuously circulating a portion of said septage from said mixing tank into a separate tank; metering said alkaline material into said portion of said septage; and reintroducing said portion of said septage into said mixing tank;

mixing said alkaline material and said septage until the entire quantity of said septage reaches a pH level of at least 12;

mixing a polymeric flocculent into said septage;

storing said septage for a period of at least 24 hours after said septage is mixed with said alkaline material;

testing said septage at least 2 hours after said septage is mixed with said alkaline material, to ensure that the pH level of said septage is at least 12; and testing said septage at least 24 hours after said septage is mixed with said alkaline material, to ensure that the pH level of said septage is at least 11.5;

thickening said septage by decanting liquid effluent from said septage;

de-watering said septage by removing the free liquids from the solids in said septage thereby producing de-watered solids;

heating said de-watered solids and said liquid effluent to predetermined temperatures for a predetermined times according to the following equations;

if the percentage of solids is seven or higher, the material is heated to a temperature of at least 50° C. and maintained at that temperature for a period of at least 20 minutes and the temperature and time period shall be determined according to the equation $$D = \frac{131{,}700{,}000}{10^{0.1400t}}$$

where, D is the time in days and t is the temperature in degrees Celsius, but if the percent of solids is less than seven, the material is heated to a temperature of at least 50° C. and maintained at that temperature for a period of at least 30 minutes and the temperature and time period shall be determined according to the equation $$D = \frac{50{,}070{,}000}{10^{0.1400t}}$$

where, D is the time in days and t is the temperature in degrees Celsius;

or if the percent of solids is less than seven, and the material is heated for a period of at least 15 seconds but less than 30 minutes, the temperature and time period shall be determined according to the equation $$D = \frac{131{,}700{,}000}{10^{0.1400t}}$$

where, D is the time in days; and t is the temperature in degrees Celsius.

42. The process of claim 41 wherein said amount of alkaline material is 250 pounds to 400 pounds per dry ton of solids in said septage.

43. The process of claim 41 wherein said amount of alkaline material is greater than 400 pounds per dry ton of solids in said septage.

44. The process of claim 41 wherein said septage is de-watered in a device selected from a group consisting of screw presses, belt presses, centrifuges, and rotary presses.

45. The process of claim 41 wherein said de-watered solids are heated in an enclosed pasteurization vessel.

46. The process of claim 41 wherein said liquid effluent is heated in a heat exchanger.

47. The process of claim 41 wherein the liquids removed during said step of de-watering said septage are combined with said liquid effluent prior to heating said effluent to a predetermined temperature for a predetermined time.

48. The process of claim 41 wherein the liquids removed during said step of de-watering said septage are combined with a subsequent quantity of septage after the subsequent quantity of septage is mixed with an alkaline material.

* * * * *